(12) United States Patent
Lee et al.

(10) Patent No.: US 9,405,744 B2
(45) Date of Patent: Aug. 2, 2016

(54) METHOD AND APPARATUS FOR MANAGING IMAGE DATA IN ELECTRONIC DEVICE

(71) Applicant: Samsung Electronics Co., Ltd., Gyeonggi-do (KR)

(72) Inventors: Gongwook Lee, Gyeonggi-do (KR); Taehwan Son, Gyeonggi-do (KR); Junho Lee, Gyeonggi-do (KR); Jinhe Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/318,416

(22) Filed: Jun. 27, 2014

(65) Prior Publication Data

US 2015/0010238 A1    Jan. 8, 2015

(30) Foreign Application Priority Data

Jul. 4, 2013    (KR) ........................ 10-2013-0078287

(51) Int. Cl.
| | | |
|---|---|---|
| *G06K 9/46* | (2006.01) | |
| *G06K 9/66* | (2006.01) | |
| *G06F 17/27* | (2006.01) | |
| *G06K 9/62* | (2006.01) | |
| *G06K 9/72* | (2006.01) | |
| *G06K 9/00* | (2006.01) | |
| *G06K 9/22* | (2006.01) | |

(52) U.S. Cl.
CPC .......... *G06F 17/277* (2013.01); *G06F 17/2735* (2013.01); *G06K 9/00442* (2013.01); *G06K 9/228* (2013.01); *G06K 9/4604* (2013.01); *G06K 9/6202* (2013.01); *G06K 9/723* (2013.01)

(58) Field of Classification Search
CPC . G06F 17/277; G06F 17/2735; G06K 9/6202; G06K 9/723
USPC .................................................. 382/190, 203
See application file for complete search history.

(56) References Cited

U.S. PATENT DOCUMENTS

| | | | |
|---|---|---|---|
| 7,006,134 B1 * | 2/2006 | Arai et al. .................. | 348/222.1 |
| 7,257,255 B2 * | 8/2007 | Pittel .............................. | 382/187 |
| 7,268,774 B2 * | 9/2007 | Pittel et al. ..................... | 345/179 |
| 7,489,305 B2 | 2/2009 | Salisbury et al. | |

(Continued)

FOREIGN PATENT DOCUMENTS

KR    10-0689060    2/2007

(Continued)

OTHER PUBLICATIONS

Extended European Search Report dated Nov. 6, 2014 in connection with European Patent Application No. 14175565.2; 4 pages.
Kieseberg, et al.; "QR Code Security"; MoMM 2010 Proceedings; SBA Research; Favoritenstrasse 16, AT-1040 Vienna, Austria; 2010; 6 pages.

*Primary Examiner* — John Strege

(57) ABSTRACT

A method for recognizing an image and an apparatus using the same. The method includes: receiving image information including a first object and a second object; recognizing position information of the first object indicated by the second information in the received image information; extracting effective information included in the first object of the received image information in response to the recognized position information; and outputting related information corresponding to the recognized effective information.

20 Claims, 15 Drawing Sheets

(56) References Cited

U.S. PATENT DOCUMENTS

| | | |
|---|---|---|
| 8,340,426 B2 | 12/2012 | Eom et al. |
| 2009/0136135 A1 | 5/2009 | Eom et al. |
| 2010/0008582 A1 | 1/2010 | Kim et al. |
| 2011/0081083 A1 | 4/2011 | Lee et al. |
| 2011/0254859 A1* | 10/2011 | Matsuda .................. 345/633 |
| 2012/0147269 A1 | 6/2012 | Cho et al. |

FOREIGN PATENT DOCUMENTS

| | | |
|---|---|---|
| KR | 20090053177 A | 5/2009 |
| KR | 10-2010-0007722 | 1/2010 |
| KR | 10-2010-0042165 | 4/2010 |
| KR | 20100122688 A | 11/2010 |
| KR | 20120063886 A | 6/2012 |
| KR | 10-2012-0086707 | 8/2012 |

* cited by examiner

METHOD AND APPARATUS FOR MANAGING IMAGE DATA IN ELECTRONIC DEVICE

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0078287, filed on Jul. 4, 2013, which is hereby incorporated by reference for all purposes as if fully set forth herein.

TECHNICAL FIELD

The present disclosure relates generally to a method for recognizing an image and a portable device using the same, and more particularly, to a method and an apparatus for extracting effective information from image information received through a camera and outputting related information corresponding to the extracted effective information.

BACKGROUND

Thanks to the recent development of technologies of portable devices, technologies for satisfying a user's convenience in hardware or software to meet the user's demands have been developed. A portable device supporting a camera function currently provides various services by using image information received through a camera. There are various techniques to edit a received image, and a technique to use the received image information in conjunction with techniques of other fields is also developed.

Such a technology includes, for example, an interworking between image information and an electronic dictionary in a portable device. However, a current portable device supporting an electronic dictionary function cannot satisfy the user's demands and convenience. In a case of a device using a general electronic dictionary function, a text requiring translation, such as a word, should be directly input, so it is time consuming and inefficient. Further, a user must divide his/her attention between a dictionary and a textbook, thereby causing difficulty in concentration In order to solve the above problem, a technology that analyzes received image information by using an Optical Character Reader (OCR) technique and provides a translation function is developed and then used. However, it is difficult to recognize effective information which the user requires and a user's attention is divided during an operation process.

Accordingly, a technology which acquires and uses required information without any division of the user's attention is necessary.

SUMMARY

To address the above-discussed deficiencies, it is a primary object to provide a method for recognizing an image and a portable device using the same. An embodiment of the present disclosure provides a method and an apparatus for receiving image information including information indicating effective information of a subject, extracting the effective information from the received image information, and outputting corresponding related information.

In accordance with an aspect of the present disclosure, a method for recognizing an image is provided. The method includes: receiving image information including a first object and a second object; recognizing position information of the first object indicated by the second object in the received image information; extracting effective information included in the first object of the received image information in response to the recognized position information; and outputting related information corresponding to the recognized effective information.

In accordance with another aspect of the present disclosure, a portable device is provided. The portable device includes: a camera unit for collecting image information including a first object and a second object; a display unit for displaying an image collected by the camera unit and related information; and an image recognition controller for recognizing position information of the first object indicated by the second object in the received image information, extracting effective information included in the first object of the received image information in response to the recognized position information, and outputting related information corresponding to the recognized effective information.

According to an embodiment of the present disclosure, when effective information of a first object is recognized, the periphery of the effective information of the first object to be recognized is indicated by a second object, thereby conveniently recognizing an object to be indicated.

Particularly, when the present disclosure is used for a portable device using an electronic dictionary, it is possible to quickly recognize a word to be translated and then output translation information without directly typing the word.

Further, since a user may fix his/her eyes on the first object, their attention may be concentrated on the first object without attention division.

In addition, the present disclosure provides an effective information extraction method, a detailed information output method, and an additional event output method which are specific to a situation applied to embodiments of the present disclosure, thereby increasing the user's convenience.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification includes a plural expression as long as they are clearly distinguished in the context. Throughout the specification, the terms such as "comprise" or "include" should not be construed as necessarily including all of the various component or steps described in the specification.

Hereinafter, embodiments of the present disclosure will be described in more detail with reference to the accompanying drawings.

The present disclosure may be applied to control a portable device providing a camera and augmented reality content.

Further, the present disclosure may be applied to an electronic terminal, such as a smart phone, a portable terminal, a mobile terminal, a Personal Digital Assistant (PDA), a Portable Multimedia Player (PMP) terminal, a note pad, a WiBro terminal, a tablet Personal Computer (PC) or the like.

Figure 1:
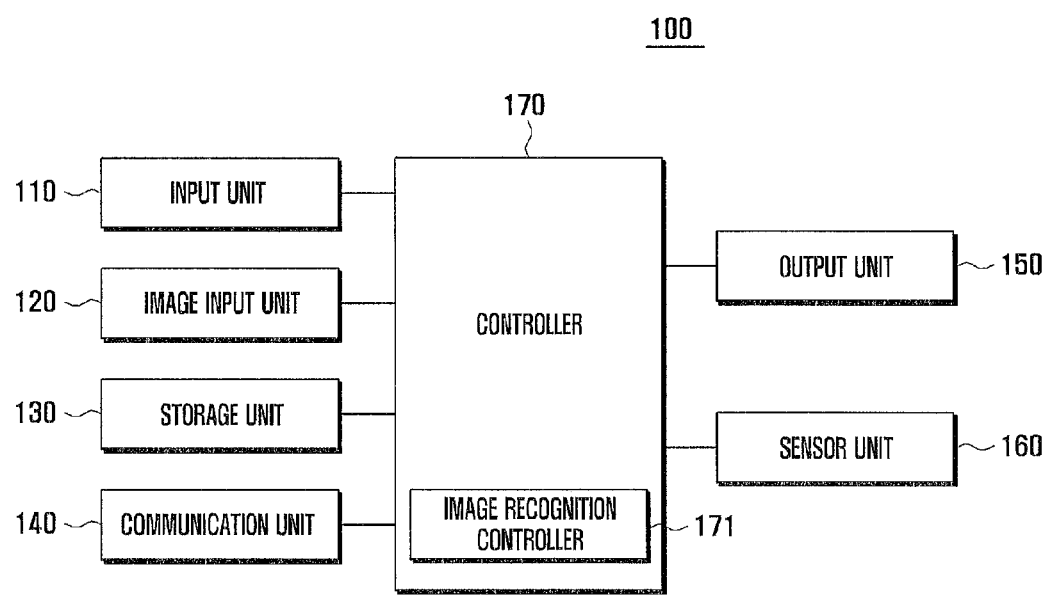
FIG. 1 illustrates a block diagram of a portable device according to an embodiment of the present disclosure.

FIG. 1 illustrates a block diagram of a portable device according to an embodiment of the present disclosure.

Referring to FIG. 1, a portable device 100 according to an embodiment of the present disclosure may include an input unit 110, an image input unit 120, a storage unit 130, a communication unit 140, an output unit 150, a sensor unit 160, and a controller 170.

Hereinafter respective components included in the portable device 100 will be described in the unit of blocks. However, it is for the technical convenience, and the blocks do not have to be divided or separated as described above.

The input unit 110 may detect a user's input and transmit an input signal corresponding to the user's input to the controller 170. The input unit may include a button, a jog dial, a wheel, and the like, and detect an input by a user's body or a pen through a touch sensor, an electromagnetic sensor, a proximity sensor, an Infrared (IR) sensor or the like.

The input unit 110 may be configured by an input pad. The input unit 110 may be configured to include a type in which various sensors are mounted onto the input pad. The input unit 110 may be configured by an input pad onto which a touch sensor is attached in a film form or with which the touch sensor is combined as a panel form. Alternatively, the input unit 110 may be configured by an input pad in the type of Electro Magnetic Resonance (EMR) or Electro Magnetic Interference using an electromagnetic sensor. The input unit 120 may be configured by one or more input pads formed in a layer structure to detect an input by using a plurality of sensors.

The input unit 110 may form a layer structure with a display unit and operate as an input screen. For example, the input unit 110 may be configured by a Touch Screen Panel (TSP) including an input pad having a touch sensor and connected with the display unit.

According to an embodiment of the present disclosure, the input unit 110 may execute a program or an application for recognizing an image and input a signal for editing or using effective information and related information output according to an operation of the portable device.

The image input unit 120 may collect an image including one or more subjects, convert the image to a data signal, and transmit the data signal to the controller 170. The controller 170 may control the output unit 150 to recognize a particular subject or display the collected image through a preview screen based on the data signal received from the image input unit 120. Further, when detecting a photographing request, the controller 170 may generate an image by using the image collected through the image input unit 120 at a time point when the photographing request is detected. The controller 170 may temporarily or permanently store the generated image in the storage unit 130.

In an embodiment of the present disclosure, the image input unit 120 may be a camera. The image input unit 120 may collect image information on an object. The image information may include image information on a first object and a second object.

The storage unit 130 may store a program or commands for the portable device 100. The controller 170 may execute the program or the commands stored in the storage unit 130 to control the operation of the portable device 100.

The storage unit 130 may include at least one type of storage medium of a flash memory type, a hard disk type, a multimedia card micro type, a card type memory (for example, an SD memory, an XD memory or the like), a Random Access Memory (RAM), a Static RAM (SRAM), a Read-Only Memory (ROM), an Electrically Erasable Programmable ROM (EEPROM), a PROM, a magnetic memory, a magnetic disk, and an optical disk.

According to an embodiment of the present disclosure, the storage unit 130 may store a program or a command for performing an image recognition operation. Also, the storage unit 130 may store a database of related information for outputting the related information corresponding to effective information. Particularly, when the effective information corresponds to a text and the related information corresponds to dictionary information on the text, the storage unit 130 may store an electronic dictionary database. Meanwhile, the related information may be stored in the storage unit 130, or the database on the related information is received from a web server by using the communication 140 and then the received database is used.

The communication unit 140 may perform data communication with the outside of the portable device 100. The communication unit 140 may include a transmitter for up-converting and amplifying a frequency of a transmitted signal and a receiver for low-noise amplifying a received signal and down-converting a frequency.

According to an embodiment of the present disclosure, the communication unit 140 may provide the related information through communication with a server. For example, when electronic dictionary related information is provided, the communication unit 140 may communicate with a database storing electronic dictionary information to make a request for the electronic dictionary information to the server, receive requested information from the server, and provide the requested information to the portable device. In another embodiment, the communication unit 140 may make a request for information on a barcode or a QR code to the server, receive the requested information from the server, and provide the requested information to the portable device. However, functions of the communication unit 140 are not limited thereto, and the communication unit 140 may be used during a process of acquiring related information by using effective information obtained from the received image.

The output unit 150 may output various information processed by the portable device 100. For example, the output unit 150 may display information corresponding to a currently executed application, program, or service together with a User Interface (UI).

The output unit 150 may include a display unit capable of displaying screen information and a sound output unit capable of outputting sound information. The display unit may include at least one of a Liquid Crystal Display (LCD), a Thin Film Transistor-Liquid Crystal Display (TFT LCD), an Organic Light-Emitting Diode (OLED), a flexible display, and a 3D display.

The display unit may form a layer structure together with a touch sensor and/or an electromagnetic sensor included in the input unit 110 and may operate as a touch screen. In this event, the display unit operating as the touch screen may perform a function of an input device.

According to an embodiment of the present disclosure, the output unit 150 may display image information received from a camera according to a control of the controller 170. Further, the output unit 150 may display effective information of the image information or related information corresponding to the effective information. With respect to the related information, additional information may be further displayed according to a user's intention. Further, a general process of recognizing the image may be displayed.

The sensor unit 160 includes a plurality of sensors for detecting a current state of the portable device 100. The sensor unit 160 may generate a control signal corresponding to the detected state and transmit the generated control signal to the controller 150.

Particularly, in various embodiments of the present disclosure, the sensor unit 160 may include a blow sensor, a Global Positioning System (GPS) sensor, a gravity sensor, and a gyro sensor to collect geographic/position information on the portable device 100.

The GPS sensor may generate current position information on the portable device 100 based on a GPS signal received from a GPS satellite through the communication unit 14. The gravity sensor may detect a direction in which the gravity acts. The gravity sensor may sense the gravity applied to the portable device 100, that is, a direction of acceleration to detect a slope of the portable device 100 or detect earth magnetism around the portable device 100, so as to determine a bearing of the portable device 100. Since the gravity sensor determines the bearing by using the earth magnetism, the gravity sensor may be configured by the geomagnetic sensor or operate similarly to the geomagnetic sensor.

The gyro sensor corresponds to a sensor for detecting a rotation angle of the portable device 100, and may detect an angle of the portable device 100 rotating with respect to a three-dimensional reference axis. For example, a gyro sensor 143 may detect a rotation angle with respect to x, y, and z axes with a center of the portable device 100 as the origin of coordinates, that is, pitch, roll, and yaw.

In an embodiment of a method in which a blow sensor detects a blow event, the blow sensor may determine whether a blow event occurs based on consideration of a power of a microphone signal received through a voice processor. For example, the blow sensor may determine whether a blow event occurs based on consideration of power of a blow band for the microphone signal, power duration, and periodicity.

In an embodiment of the present disclosure, the sensor may additionally display information detected through the sensor during a process of using the image recognition or allow an additional operation to be performed by an input through the sensor. Particularly, an operation of scrolling, switching, and rotating a displayed screen may be performed by using the blow sensor or the gravity sensor.

The controller 170 may control the respective components for the general operation of the portable device 100. For example, the controller 170 may process and then use the received image information to perform an image recognition operation.

Particularly, the controller 170 according to the present disclosure may further include an image recognition controller 171. The image recognition controller 171 makes a control such that effective information is extracted from the image information input through the image input unit and related information corresponding to the effective information is output.

In an embodiment of the present disclosure, the image recognition controller 171 may make a control such that position information of a first object indicated by a second object is recognized from the image information, effective information included in the first object of the received image is extracted in accordance with the recognized position information, and related information corresponding to the recognized effective information is output Further, the image recognition controller 171 may recognize a shape for indicating a particular area of the first object. In an embodiment, the image recognition controller 171 may recognize an object shaped like a finger or a pen, and extract position information of a part indicated by an end of the object. A method for recognizing an object or extracting position information will be described below in more detail.

In an embodiment of the present disclosure, the image recognition controller 171 may recognize effective information existing on the first object, such as a text, a barcode, a QR code, or the like, in the received image information.

In an embodiment of the present disclosure, the image recognition controller 171 may make a control such that the related information is displayed on an information display area located at a preset distance from the recognized effective information of the first object.

In an embodiment of the present disclosure, the image recognition controller 171 may make a control such that, when the effective information is changed, new related information corresponding to recognized new effective information is output.

Particularly, in an embodiment of the present disclosure, when the portable device supports an electronic dictionary function, the first object may be an object including information on a text, the effective information may be text information, and the related information may include translation information of a preset language corresponding to the text information. In this case, the image recognition controller 171 may make a control such that the text information of the recognized effective information is searched for in conjunction with an electronic dictionary database and then a found translation result is displayed.

Further, when a detailed information request event is detected, the image recognition controller 171 may make a control such that dictionary detail information including at least one of a meaning, a pronunciation, a sample sentence, an idiom, a synonym, an antonym, a derivative, and a part of speech of the translation information is displayed.

In addition, when a scroll command is input while the detailed information is displayed, the image recognition controller 171 may make a control such that the detailed information is output while being scrolled.

Meanwhile, although the image recognition controller 171 has been illustrated and described as a separated block within the controller 170, it is for the technical convenience and the image recognition controller 171 does not necessarily have to be separated. For example, the controller 171 may perform a particular function of the image recognition controller 171. Further, the image recognition controller 171 may be separately located at the outside of the controller 170.

Figure 2:
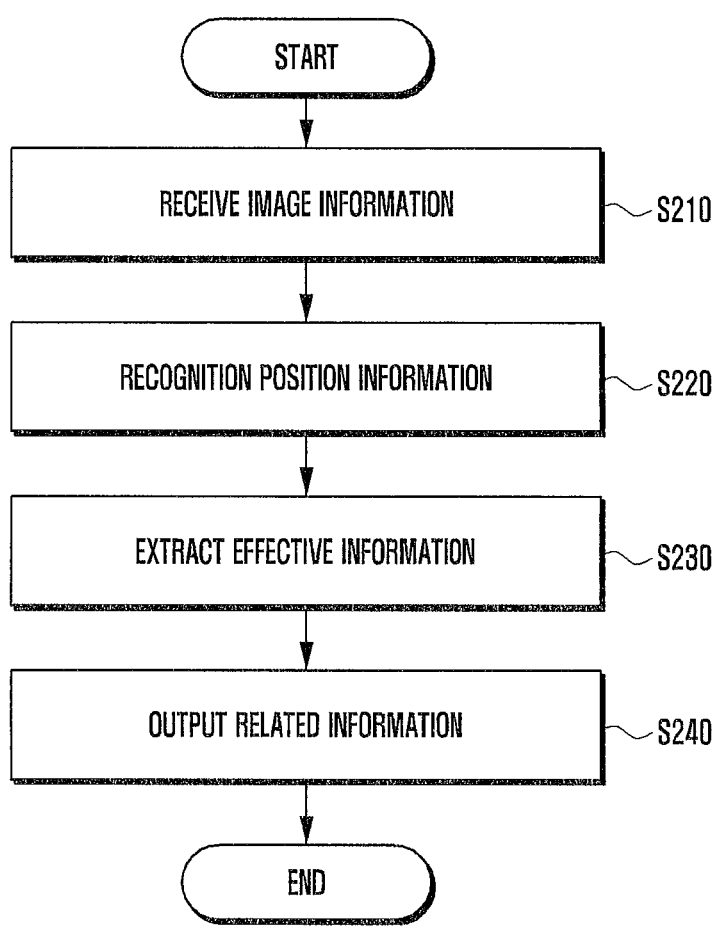
FIG. 2 illustrates a flowchart of a method for recognizing an image according to an embodiment of the present disclosure.

FIG. 2 illustrates a flowchart of a method for recognizing an image according to an embodiment of the present disclosure.

First, the image input unit 120 may collect image information in step S210. The image information collected by the image input unit 120 may be received by the storage unit 130 or the controller 170. The image information may include image information on a first object and a second object. That is, the image information according to the present disclosure refers to image information generated by photographing the first object and the second object as subjects. Accordingly, the above method is different from a method in which the electronic device photographs the first object and then provides a new second object to set a particular area of the first object.

The first object described in the embodiment of the present disclosure may be a medium displaying effective information. Accordingly, the first object may include a document, a book, an electronic device, and the like which display effective information. The second object may be an object used for indicating particular effective information of the first object. Accordingly, the second object may have a shape which can indicate the effective information of the first object according to a designation by the user to be distinguished from the first object. In an embodiment, the second object may be shaped like a finger or a pen. The shape like the finger or the pen may refer to a bar shape having one extending end or a shape of which one distal end is pointed or gradually becomes narrower (e.g., tapers) like an end of a pen or a finger.

In step S220, the image recognition controller 171 may recognize position information of the first object indicated by the second object in the received image information. A method for recognizing position information indicated by the second object may include using the Hough transform as an example. The Hough transform corresponds to a line extraction technique used in image processing. A detailed description of the line extraction technique of the Hough transform will be omitted since it is a generally known technique.

A step of recognizing the position information may include a step of extracting an outline of the second object and a step of returning the position information indicated by the second object based on the extracted outline. More specifically, when the second object is shaped like a pen or a finger, lines of the outline of the second object may be acquired using the Hough transform. The image recognition controller 171 may recognize the position information on the area indicated by the second object by using the outline of the second object according to a result of the Hough transform. In this case, when the second object is shaped like a pen or a finger, an indicating area of the second object may be a part of the second object having the smallest thickness in the second object's cross-section, such as a distal end of the pen or the finger. The image recognition controller 171 may return a coordinate of the position indicated by the second object, that is, the distal end of the pen or the finger to recognize the position information of the first object indicated by the second object.

Another method for recognizing the position information of the first object includes a method for detecting a preset object shape. That is, the position information may be recognized through a step of determining whether a second object having a shape of which similarity to a preset shape including position return information is equal to or larger than a threshold is included in the image information and a step of, when it is identified that the similarity is equal to or larger than the threshold, returning the position information indicated by the second object in accordance with the position return information of the preset shape.

More specifically, the portable device 100 may store an object shape including the position return information. The number of object shapes including the position return information may be plural. For example, an object having a shape which extends in one direction, such as a pen or a finger and having a distal end which becomes narrower along the extending direction or is pointed may be recognized as the second object. However, the shape which may be preset is not limited thereto. The image recognition controller 171 having received the image information may determine whether there is a preset shape object in the received image information. The image recognition controller 171 compares the preset shape with the received image. When the similarity there between is equal to or larger than a threshold, the controller 171 may determine that the second object exists. When it is determined that the preset shape exists, the portable device 100 may set to return the position information corresponding to each of the preset shapes. For example, when the object shaped like a pen or a finger having the similarity to the preset shape which is equal to or larger than the threshold is included in the received image, the portable device 100 may set to return position information of the distal end of the pen or the finger. The image recognition controller 171 may recognize position information of the first object indicated by the second object by using a returned coordinate.

The method for recognizing the position information is an embodiment for recognizing the position information, but the method of the present disclosure is not limited thereto.

Next, in step S230, effective information included in the first object of the received image may be extracted in accordance with the recognized position information. In step S220, the image recognition controller 171 recognizes the position information indicated by the second object. Accordingly, the effective information corresponding to the position information may be extracted. The effective information may be extracted within a predetermined range from a recognized position according to a setting by the user or extracted according to a particular direction or sequence.

The effective information according to the present disclosure may include a text, a barcode, a QR code, and an image displayed by the first object. However, the effective information is not limited thereto, and may include all types of contents which can be recognized by the image recognition controller 171 through the received image information.

Next, in step S240, the image recognition controller 171 may output related information corresponding to the recognized effective information. In an embodiment of the present disclosure, a text may be recognized as the effective information and electronic dictionary search information may be output as the related information. However, the related information used in the present disclosure is not limited to the outputting of the electronic dictionary information. The related information may be combined with various operations which can be used by the portable device, such as an operation of recognizing a text to find a phone number, an operation of executing an application within the portable device, and an operation of searching for a recognized text as well as the electronic dictionary operation. Further, when the effective information corresponds to a QR code, a barcode, or an image, related information corresponding to the effective information may be output. In the present disclosure, the related information may be stored in the storage unit 140 as a database, or data may be received through a web and then output as necessary.

FIGS. 3A to 3D illustrate capture screens for describing the respective steps of FIG. 2. FIGS. 3A to 3D describe an example in which an electronic dictionary is used through the image recognition as an embodiment. However, the present disclosure is not limited to only using the electronic dictionary.

Figure 3A:
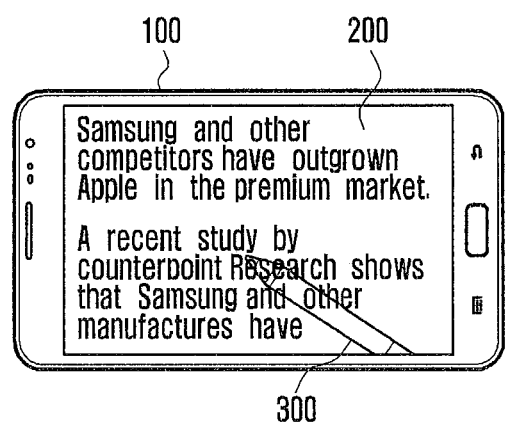
FIGS. 3A to 3D illustrate capture screens for describing respective steps of FIG. 2.

Referring to FIG. 3A, the operation in step S210 can be understood. In FIG. 3A, the portable device 100 may identify that image information is received through the image input unit 120. The image information includes a first object 200 including texts and a second object 300 indicating a particular area of the first object. An embodiment of FIGS. 3A to 3D describes an example in which the first object 200 is a book including the texts and the second object 300 is a pen.

Figure 3B:
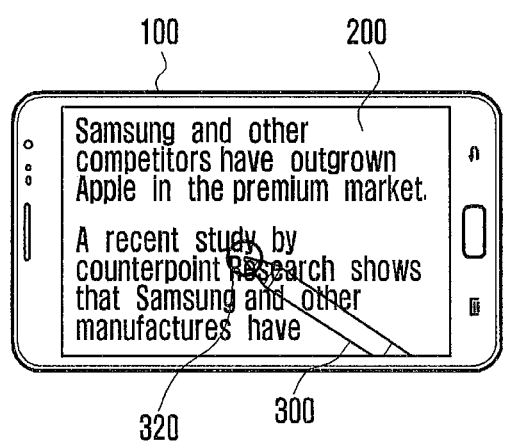

Next, referring to FIG. 3B, the image recognition controller 171 may recognize position information of the first object 200 indicated by the second object 300 in step S220. For example, the image recognition controller 171 may recognize an area 320 as a position area indicated by the second object 300.

Figure 3C:
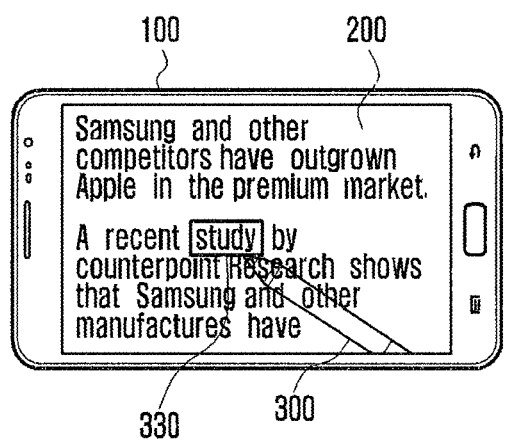

Referring to FIG. 3C, the image recognition controller 171 may extract effective information 330 in step S230. In an embodiment, the image recognition controller 171 may extract the word "study" as the effective information.

A method for extracting effective information according to the present disclosure may use an Optical Character Reader (OCR). A detailed description of the OCR will be omitted since the OCR is included in the same technical field. Further, the method may use a character recognition algorithm. In an embodiment of the character recognition algorithm, a clustering algorithm of machine learning may be used. There may be a method for extracting a cluster most close to an area where the position information is recognized and converting characters in the extracted cluster by using the clustering algorithm.

The text information which will be extracted as the effective information may be differently selected from a plurality of pieces of text information according to a setting by the user. In an embodiment of FIG. 3C, a method for selecting and outputting a word cluster most close to the recognized position information is used. When the area for extracting the effective information is expanded according to a setting by the user, effective information on a plurality of texts may be extracted. Further, a word cluster included in a column of the selected position information may be selected as well as a word, or a sentence including the selected word may be recognized as the effective information.

Figure 3D:
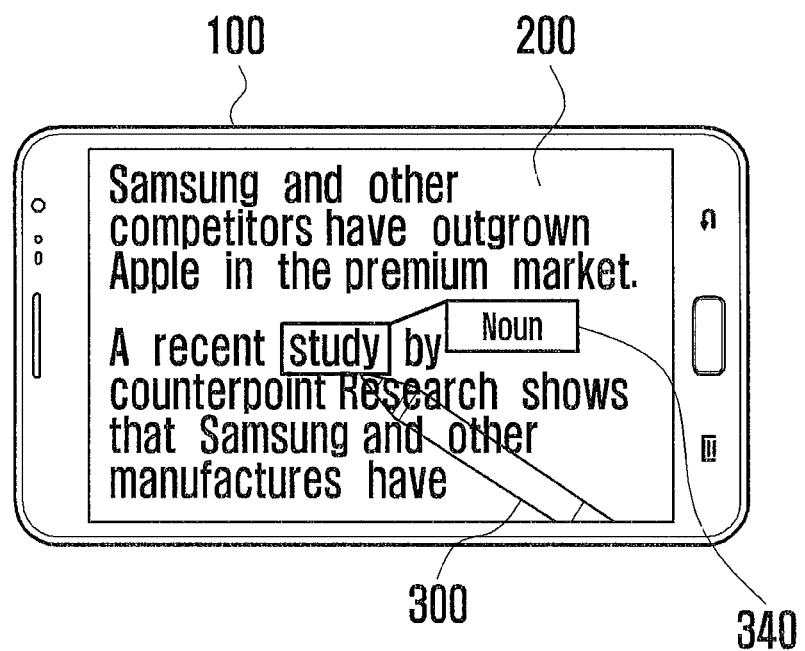

Referring to FIG. 3D, the image recognition controller 171 may output related information 340 corresponding to the recognized effective information in step S240. FIG. 3D illustrates, as an example, that translation information corresponding to the word which is the effective information selected in step S230 is displayed as the related information 340. In the embodiment, although simple translation information is displayed, detailed translation information may be displayed according to a setting by the user. The image recognition controller 171 may display the related information 340 on a related information display area located at a preset distance from the effective information 330. Further, by setting the related information display area to be distinguished from the first object 200, the related information display area may be recognized distinguishably from contents included in the first object 200. In addition, the related information 340 may overlap the first object 200 to be displayed by augmented reality.

In an embodiment of the present disclosure, a text may be recognized as the effective information in the received image information and electronic dictionary search information on the text may be output as the related information. However, the related information used in the present disclosure is not limited to the outputting of the electronic dictionary information. The related information may be combined with various operations which can be used by the portable device, such as an operation of recognizing a text to find a phone number, an operation of executing an application within the portable device, and an operation of searching for a recognized text as well as the electronic dictionary operation. When the effective information corresponds to a QR code, a barcode, or an image, related information corresponding to the effective information may be output. In the present disclosure, the related information may be stored in the storage unit 140 as a database, or data may be received through a web and then output as necessary.

Next, a detailed information output will be described based on FIGS. 4 and 5.

Figure 4:
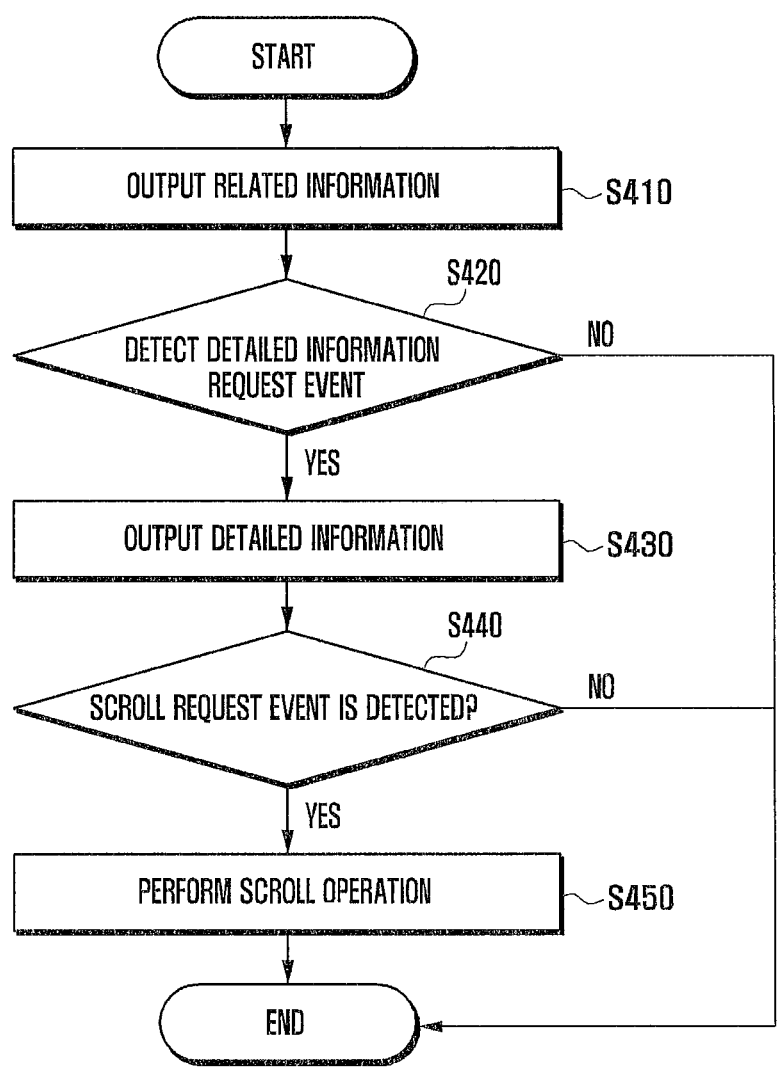
FIG. 4 illustrates a flowchart for an operation of outputting detailed information according to an embodiment of the present disclosure.
Figure 5A:
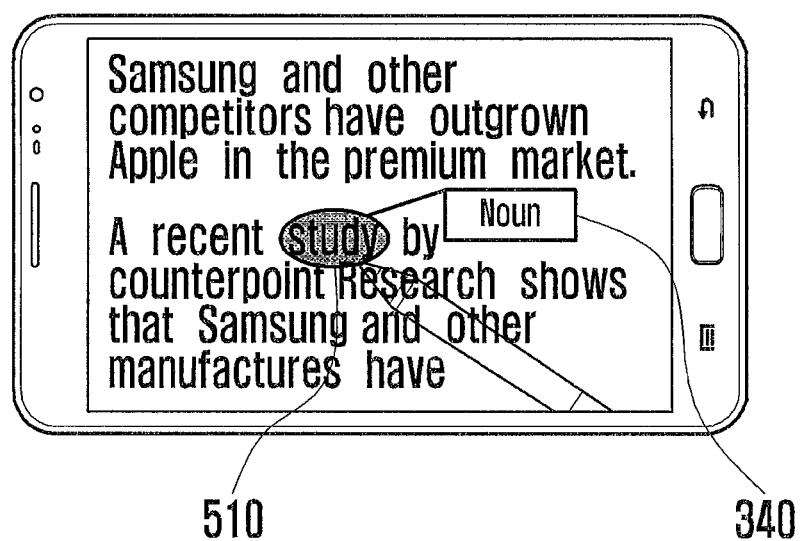
FIGS. 5A to 5C illustrate capture screens for describing respective steps of FIG. 4.
Figure 5B:
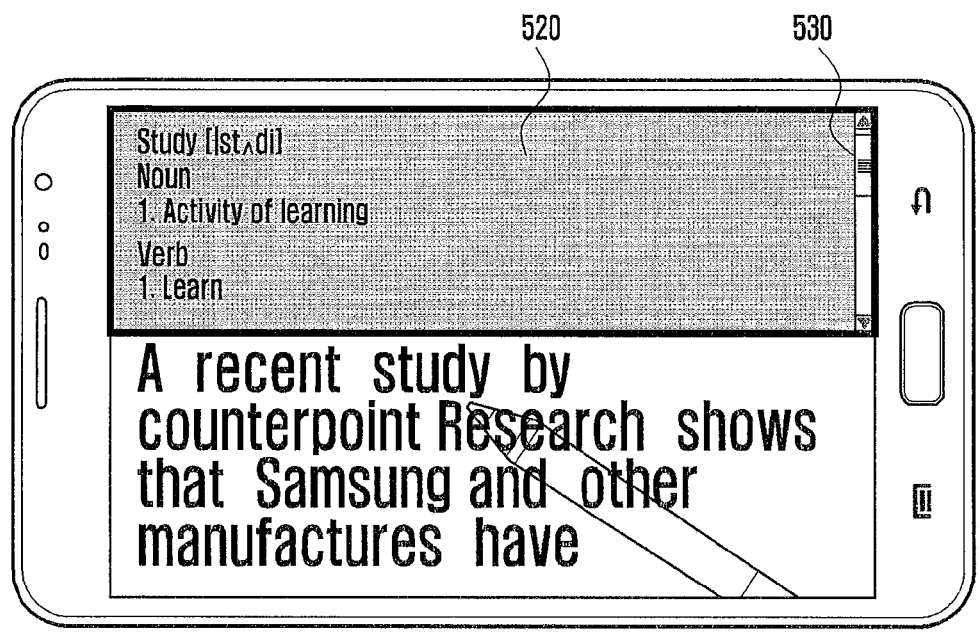
Figure 5C:
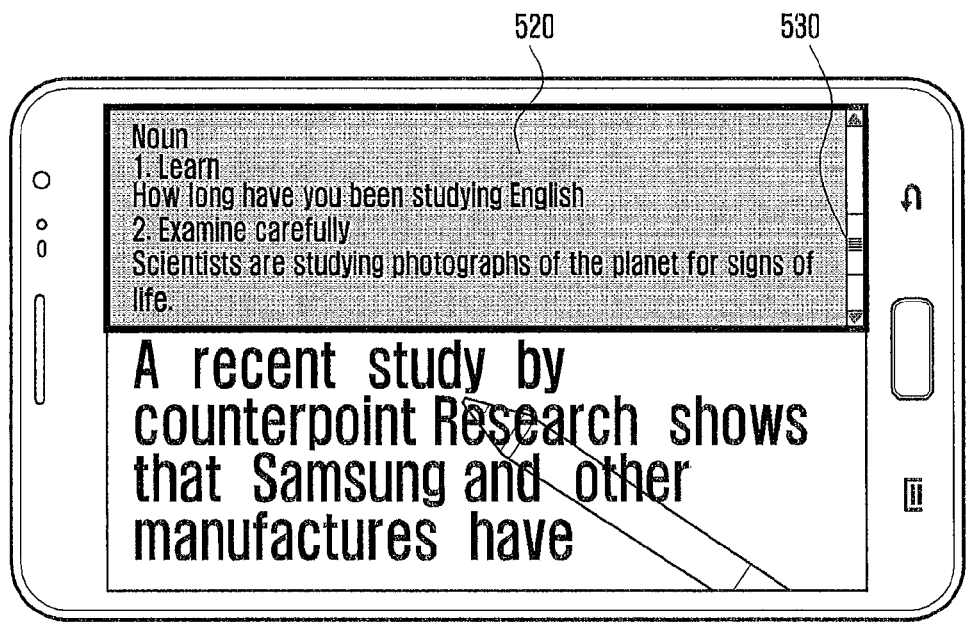

FIG. 4 illustrates a flowchart for an operation of outputting detailed information according to an embodiment of the present disclosure, and FIGS. 5A to 5C illustrate capture screens for describing respective steps of FIG. 4.

In an embodiment applied to the electronic dictionary, the detailed information described in FIG. 4 may be dictionary detailed information corresponding to a word extracted as the effective information. That is, with respect to "study" recognized as the effective information 330, the related information 340 in FIG. 3D includes the simple translation information on "study", but the detailed information includes detailed dictionary information on "study". For example, the detailed information may include a meaning, a pronunciation, a sample sentence, an idiom, a synonym, an antonym, a derivative, a part of speech, and the like corresponding to the translation information.

A screen in step S410 may be the screen corresponding to FIG. 3D.

In step S420, the image recognition controller 171 may detect whether there is a detailed information request event while the related information corresponding to the extracted effective information is output.

The detailed information request event may be variously defined according to a user's definition. In an embodiment, the detailed information request event may be detected by sensing a particular event applied to the currently extracted effective information by the second object. For example, as illustrated in FIG. 5A, the detection of the detailed information request event may be achieved by detecting a movement of the second object in a circular shape 510 around the selected effective information or detecting a movement of the second object overlapped on the effective information. As described above, when the movement of the second object is recognized as the input, a detection of an additional event may be achieved by detecting the movement of the second object made on the first object without applying separate pressure to the input unit of the portable device 100 as the detailed information request event. Accordingly, it is possible to increase the user's convenience. However, the detailed information request event is not limited thereto, and may include various inputs using the input unit 110, a touch panel, and a variety of sensors.

When the detailed information request event is detected, the image recognition controller 171 may output detailed information 520 as illustrated in FIG. 5B in step S430.

When the detailed information is displayed, there may be a situation in which all dictionary detailed information cannot be displayed on the detailed information display area. This corresponds to an example embodiment where an amount of detailed information on the related information of the electronic dictionary is large and a display size of the portable device 100 is limited. In this example embodiment, all contents of the detailed information which are not displayed all may be identified by using a scroll or a screen switching method.

In step S440, the image recognition controller 171 may detect a scroll request event. The scroll request event may be requested by a touch on a touch panel or through an input unit. Further, in the present disclosure, the scroll event may be made by using the blow sensor or the gravity sensor. When the blow sensor or the gravity sensor is used, the scroll request event may be generated without the input through the touch panel or the input unit.

When the gravity sensor is used, a scroll bar 530 moves in a tilting direction of the portable device and thus a scroll operation or a screen switching operation may be performed. Further, a speed of the scroll operation or the screen switching operation may be controlled according to a tilting angle. When the blow sensor is used, the scroll operation or the screen switching operation may be performed according to a wind input through the microphone. Further, a speed of the scroll operation or the screen switching operation may be controlled according to a blow intensity. Since the method of operating the sensor has been described through FIG. 1, a detailed description thereof will be omitted.

When a scroll request event is detected, the image recognition controller 171 may perform a scroll operation in step S450. As shown in FIG. 5C, the detailed information 520 which has not been displayed before the scroll operation may be identified while the scroll bar 530 moves according to the scroll request event.

Meanwhile, although the scroll request event is expressed for the convenience of the description in the present embodiment, all operations for displaying information which has not been displayed on a current screen through screen switching as well as the scroll may be included.

Next, an operation in a case where the effective information is changed will be described with reference to FIGS. 6 and 7A to 7C.

Figure 6:
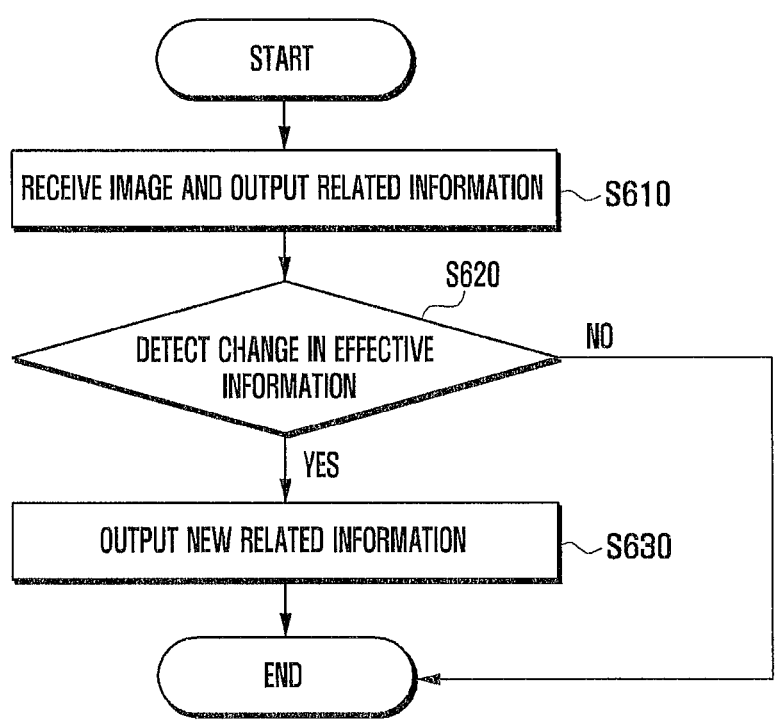
FIG. 6 illustrates a flowchart for an operation of a portable device when effective information is changed according to an embodiment of the present disclosure.
Figure 7A:
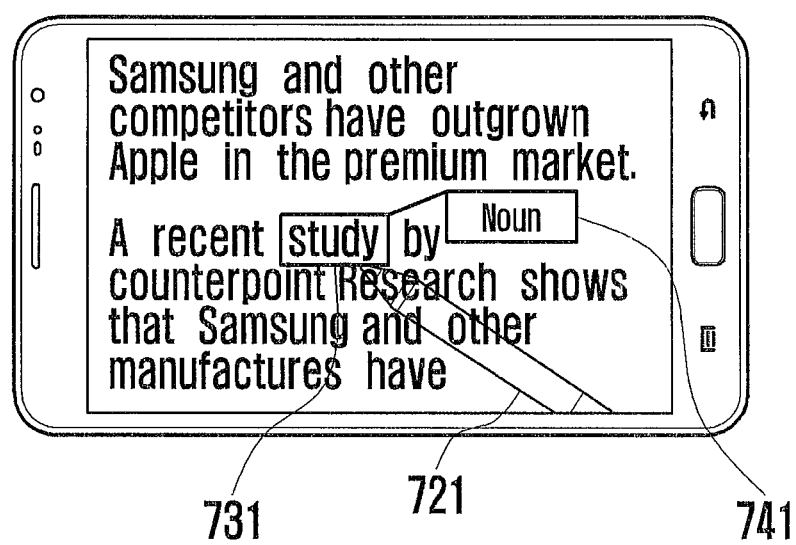
FIGS. 7A to 7C illustrate capture screens for describing respective steps of FIG. 6.
Figure 7B:
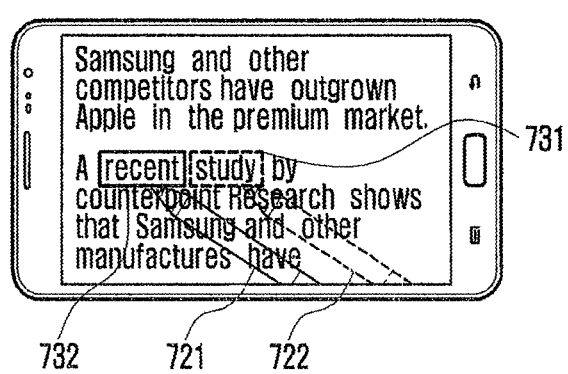
Figure 7C:
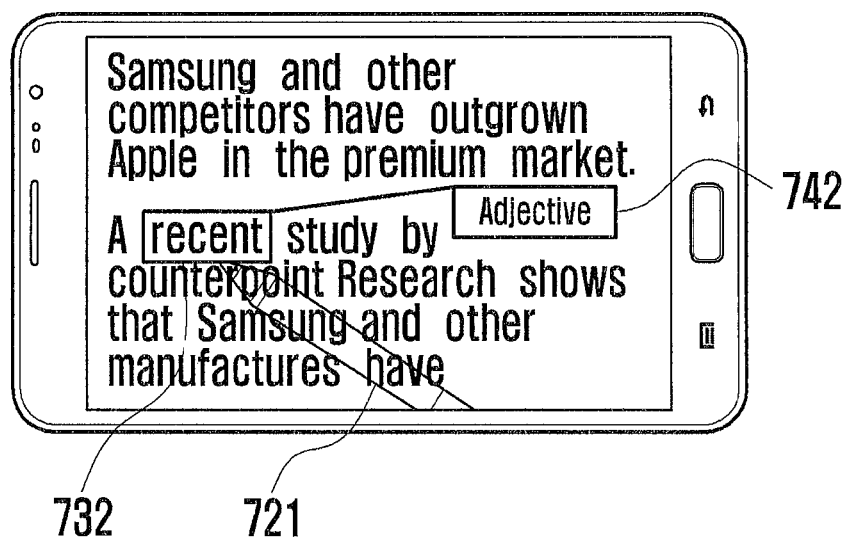

FIG. 6 illustrates a flowchart for an operation of the portable device when the effective information is changed according to an embodiment of the present disclosure, and FIGS. 7A to 7C illustrate capture screens for describing respective steps of FIG. 6.

First, in step S610, the portable device 100 displays related information 641 corresponding to effective information 631 as shown in FIG. 7A.

In step S620, the image recognition controller 171 may determine whether the effective information is changed. When it is determined that the image information is changed by analyzing the image received through the input image unit 120, the image recognition controller 171 may identify position information indicated by the second object and identify effective information corresponding to the position information to determine whether the effective information is changed. As illustrated in FIG. 713, the second object is located at a position 722 at a previous time point, and the second object at the position 722 indicates effective information 731. However, the second object moves to a position 721, and thus the effective information currently indicated by the second object is changed to effective information 732. In this case, the image recognition controller 171 may recognize that the effective information is changed.

When the image recognition controller 171 recognizes the change in the effective information, the image recognition controller 171 may provide a control such that the display unit displays related information corresponding to the new effective information in step S630. As illustrated in FIG. 7C, new related information 742 corresponding to the extracted new effective information 732 may be output in accordance with the position information indicated by the second object 721.

Meanwhile, in an embodiment of FIGS. 7A-7C, when the new related information is extracted, the previous related information is not output. However, the output method of the present disclosure is not limited thereto, and the present disclosure may use a method for displaying the new information by using a fade-in or fade-out effect and removing the previous information as well as a method for displaying the new related information while maintaining the display of the previous related information.

A method for changing the effective information may include three cases where the first object moves, the second object moves, and the portable device moves. Accordingly, although FIGS. 7A-7C illustrate the case where the second object moves, the present disclosure is not limited thereto.

Meanwhile, in the conventional method for using the electronic dictionary of the portable device, a particular shape may be overlaid on a preset area of the display unit of the portable device, so as to enable the user to indicate an intended text. In this case, in order to search for a new word, the user is required to move the portable device, and thus entire image information of the first object received through the image is changed, thereby deteriorating concentration of the user. Referring to the embodiments of FIGS. 7A-7C according to the present disclosure, new effective information may be indicated by changing a position of the second object in a state where positions of the portable terminal and the first terminal are fixed. Accordingly, it may be a more effective dictionary usage method for learning for the user.

Figure 8:
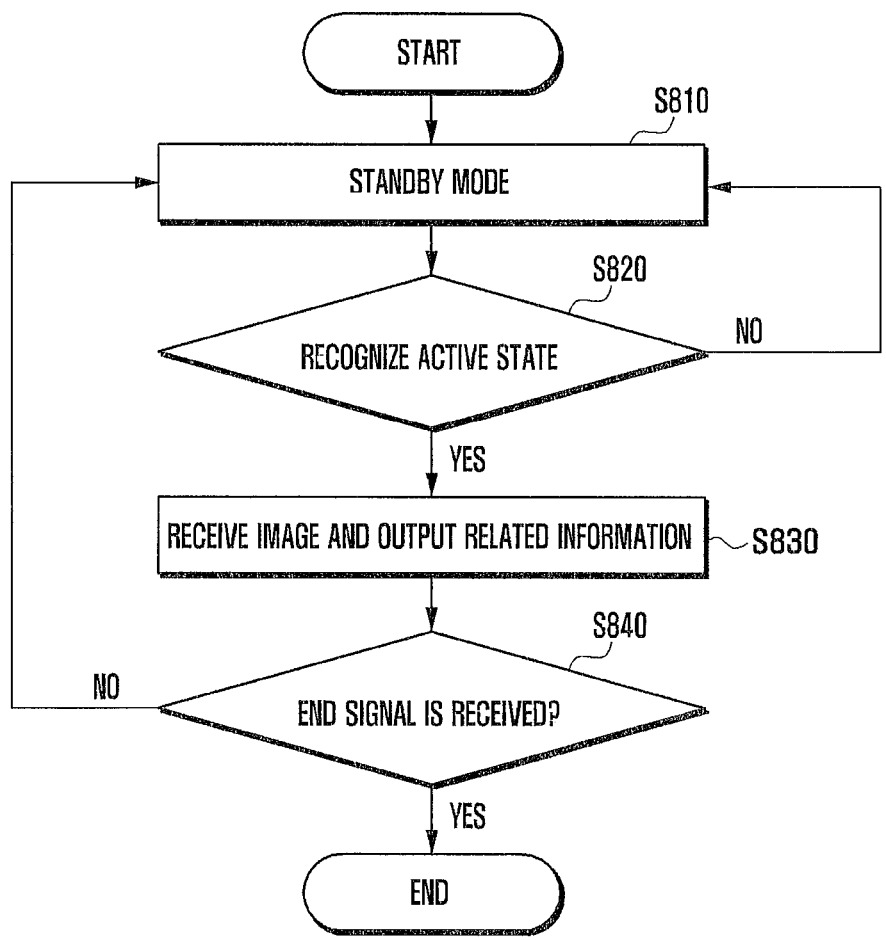
FIG. 8 illustrates a flowchart for a standby mode switching operation according to an embodiment of the present disclosure.

Next, a standby mode operation will be described with reference to FIG. 8. FIG. 8 illustrates a flowchart for a standby mode switching operation according to an embodiment of the present disclosure.

In step S810, the portable device 100 may be in a standby mode. The standby mode may refer to an inactive state for the image recognition. When the user does not use the image recognition system at present, the portable device 100 may be in the inactive state. Whether the user uses the image recognition system may be determined through various methods. For example, when average brightness incident through the image input unit 120 is equal to or lower than a particular level, the user may determine that the portable device 100 is laid on the ground and recognize that the portable device 100 is in the inactive state. Alternatively, when the same image information is input for a time equal to or longer than a preset time, the portable device 100 may be recognized as being in the inactive state. Further, a command for entering the inactive state may be input through the input unit.

In step S820, the controller 170 may determine whether the portable device 100 is activated. A method for determining whether the portable device 100 is activated varies. An activation command may be input through the input unit 110. When the portable device 100 detects a movement, the movement is detected by an acceleration sensor and then the portable device 100 is determined as being in the active state. Further, when average brightness incident through the image input unit 120 is equal to or higher than a particular level, the portable device 100 may be determined as being in the active state. Also, when image information received through the image input unit 120 is changed, the portable device 100 may be recognized as in the active state.

When the portable device 100 is in the active state, the image information may be received, the effective information may be extracted, and the related information corresponding to the effective information may be output through the methods as illustrated in FIGS. 2, 4, and 6 in step S830.

In step S840, when an end signal is input, the image recognition operation may end. When the end signal is not input, the portable device 100 may be recognized as being in the inactive state, and thus return back to the standby mode.

The present disclosure as described above can effectively manage power of the portable device 100 by managing active and inactive states and increase the user's convenience.

Although the various embodiments of the present disclosure have been described, the scope of the present disclosure is not limited thereto, and various changes and modifications can be made without departing from the essential features of the present disclosure by those skilled in the art. Accordingly, the embodiments disclosed in the present disclosure are for describing, but not limiting, the technical idea of the present disclosure, and the scope of the technical idea of the present disclosure is not limited by the embodiments. The protection range of the present disclosure should be construed by the appended claims, and all technical ideas within a range equivalent to the protection range should be construed as being included in the scope of the present disclosure.

What is claimed is:

1. A method for recognizing an image, the method comprising:
   receiving image information including a first object and a second object;
   identifying position information of the first object indicated by the second object in the received image information;
   extracting effective information included in the first object of the received image information in response to the identified position information;
   displaying related information with the extracted effective information of the first object; and
   identifying and displaying detailed information beyond the related information in response to detecting a movement of the second object relative to the first object that is in addition to the position information of the first object indicated by the second object.

2. The method of claim 1, wherein the second object has a shape extending in a first direction and a width in a second direction perpendicular to the first direction, the width tapering along the first direction.

3. The method of claim 1, wherein identifying the position information comprises:
   extracting an outline of the second object; and
   returning the position information indicated by the second object based on the extracted outline.

4. The method of claim 1, wherein identifying the position information comprises:
   determining whether the second object, of which similarity to a preset shape including position return information is greater than or equal to a threshold, is included in the image information; and
   returning the position information indicated by the second object in response to the position return information of the preset shape in response to identifying the second object having the similarity greater than or equal to the threshold.

5. The method of claim 1, wherein the effective information includes at least one of a text, a barcode, or a QR code.

6. The method of claim 1, wherein displaying the related information comprises displaying the related information on an information display area located at a preset distance from the extracted effective information of the first object.

7. The method of claim 1, further comprising:
   detecting a change in the effective information indicated by the second object; an outputting new related information corresponding to recognized new effective information in response to detecting the change.

8. The method of claim 1, wherein:
   the effective information corresponds to text information;
   the related information includes translation information of a preset language corresponding to a text; and
   displaying the related information comprises searching for the text information of the extracted effective information in conjunction with an electronic dictionary database and displaying a found translation result.

9. The method of claim 8, wherein the displayed detailed information comprises dictionary detailed information including at least one of information on a meaning, a pronunciation, a sample sentence, an idiom, a synonym, an antonym, a derivative, or a part of speech corresponding to the translation information.

10. The method of claim 9, wherein displaying the displayed information comprises, when a scroll command is input while the detailed information is displayed, outputting the detailed information while scrolling the detailed information.

11. A portable device comprising:
   a camera unit configured to collect image information including a first object and a second object;
   a display unit configured to display an image collected by the camera unit, related information, and detailed information; and
   an image recognition controller configured to identify position information of the first object indicated by the second object in the collected image information, extract effective information included in the first object of the received image information in response to the identified position information, and cause the display unit to display the related information with the extracted effective information of the first object, and identify and cause the display unit to display detailed information beyond the related information in response to detecting a movement of the second object relative to the first object that is in addition to the position information of the first object indicated by the second object.

12. The portable device of claim 11, wherein the second object has a shape extending in a first direction and a width in a second direction perpendicular to the first direction, the width tapering along the first direction.

13. The portable device of claim 11, wherein the image recognition controller is configured to extract an outline of the second object from the received image, and return the position information indicated by the second object based on the extracted outline.

14. The portable device of claim 11, wherein the image recognition controller is configured to:
 determine whether the second object, of which similarity to a preset shape including position return information is greater than or equal to a threshold, is included in the image information; and
 return the position information indicated by the second object in response to the position return information of the preset shape in response to identifying the second object having the similarity greater than or equal to the threshold.

15. The portable device of claim 11, wherein the effective information includes at least one of a text, a barcode, or a QR code.

16. The portable device of claim 11, wherein the image recognition controller is configured to provide a control such that the related information is displayed on an information display area located at a preset distance from the extracted effective information of the first object.

17. The portable device of claim 11, wherein, when the effective information is changed, the image recognition controller is configured to provide a control such that new related information corresponding to recognized new effective information is output.

18. The portable device of claim 11, wherein:
 the effective information corresponds to text information;
 the related information includes translation information of a preset language corresponding to a text; and
 the image recognition controller is configured to provide a control such that the text information of the recognized effective information is searched for in conjunction with an electronic dictionary database and a found translation result is displayed.

19. The portable device of claim 18, wherein the displayed detailed information comprises dictionary detailed information including at least one information of a meaning, a pronunciation, a sample sentence, an idiom, a synonym, an antonym, a derivative, or a part of speech corresponding to the translation information is displayed.

20. The portable device of claim 19, wherein, when a scroll command is input while the detailed information is displayed, the image recognition controller is configured to output the detailed information while scrolling the detailed information.

\* \* \* \* \*